HIGH POWER NOISE SOURCE EMPLOYING A FEEDBACK
PATH AROUND A TRAVELLING WAVE TUBE
Filed Nov. 16, 1961

INVENTORS
CARL A. RIES
JOHN E. ZELLERS
BY
[signature]
ATTORNEY

United States Patent Office 3,178,655
Patented Apr. 13, 1965

3,178,655

HIGH POWER NOISE SOURCE EMPLOYING A FEEDBACK PATH AROUND A TRAVELLING WAVE TUBE

Carl A. Ries, New Hyde Park, and John E. Zellers, Great Neck, N.Y., assignors to Sperry Rand Corporation, Great Neck, N.Y., a corporation of Delaware Filed Nov. 16, 1961, Ser. No. 152,883
7 Claims. (Cl. 331—78)

This invention relates to an electronic noise source, and more particularly to a high power noise source for generating noise within the microwave frequency spectrum.

In testing electromagnetic wave receivers it often is desirable to determine the sensitivity of the receiver in the presence of noise. One means for generating high power noise in the microwave frequency spectrum is comprised of a gas discharge tube followed by one or more traveling wave tube amplifiers which amplify the noise in the microwave frequency spectrum put out by the gas discharge tube. Another type of noise generator for this use is a traveling wave tube operating without an input signal so that it amplifies only its own noise. This latter means is simple but has the disadvantage that the magnitude of the noise at the output of the tube is a function of the tube's gain and noise figure and can be on the order of one milliwatt of noise power so that additional traveling wave tube amplifiers are necessary where a greater magnitude of noise is required.

It therefore is an object of this invention to provide a simple high power noise generator.

It is a further object of this invention to provide a simple microwave frequency noise generator which employs a minimum of microwave equipment.

Another object of this invention is to provide a traveling wave tube operated in a manner to produce random noise at a relatively high power level throughout a wide frequency spectrum.

These and other objects of this invention, which will become apparent from the specification and claims below, are achieved by providing an electron device of the traveling wave tube variety wherein a slow wave propagating structure is provided with input and output terminals through which electromagnetic waves enter and leave said tube. Means are provided for sampling electromagnetic waves from the output of said tube and coupling them back to the input thereof, thus forming a closed loop with said tube. No other input to the tube is provided. The electrical length of the loop is chosen so that the propagating time of waves around said loop is at least equal to 20 times the reciprocal of the bandwidth of said loop. The loop is operated with a relatively high open-loop gain of at least 10 db, and commonly 25 to 30 db. With these conditions present, and with a minimum bandwidth of approximately 50 megacycles, the tube will operate in a stable manner to amplify its own noise and produce a saturated output of relatively wide bandwidth, high power noise.

The invention will be described by referring to the accompanying drawings wherein.

Figure 1:
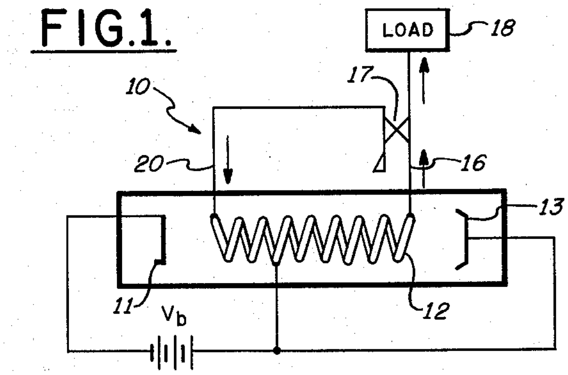
FIG. 1 is a simplified schematic illustration of an embodiment of the wide band, high power noise generator of this invention.

Referring now more particularly to FIG. 1 of the drawings, the noise generator is comprised of a conventional traveling wave tube 10 having an electron emitting cathode 11, a slow wave propagating structure 12 and a collector electrode 13. In the conventional manner, slow wave structure 12 and collector electrode 13 are electrically biased by a voltage source $V_b$ at a positive potential with respect to cathode 11. Output terminal 16 of traveling wave tube 10 is coupled to one terminal of the primary waveguide of directional coupler 17. A load 18 is coupled to the other terminal of the primary waveguide of directional coupler 17, and the secondary waveguide thereof is coupled back to the input terminal 20 of traveling wave tube 10, thereby forming a closed loop with said tube.

The tube desirably is operated with a relatively high open-loop gain between 25 to 30 db. It has been found that in the successful operation of the tube the open-loop gain and the bandwidth are interrelated with the loop gain being an inverse function of the bandwidth. The tube has been operated successfully as a high power noise generator with a minimum open-loop gain of 10 db and a loop bandwidth of 2,000 megacycles. It has been found that operation in accordance with this invention was extremely difficult to obtain for a loop having a bandwidth below 50 megacycles. For decreases in the bandwidth by amounts equal to $\frac{1}{10}$ of the 2,000 megacycles mentioned above, it has been found that successful operation of the noise source can be achieved by increasing the gain approximately 10 db for each of said decrements of bandwidth. It also has been found that the length of the closed loop and the gain are interrelated and important. Generally speaking, the shorter the closed loop the higher the gain required in order for the device to operate as a high power noise source. The minimum time for propagation of waves around the closed loop should be approximately 20 times the reciprocal of the bandwidth of the loop. An important consideration in the length of the loop is to assure that the noise fed back to the input of the tube does not correlate with newly generated noise in the tube. To assure this condition, the correlation function should have a magnitude no greater than $e^{-20}$, where $e$ is the base of natural logarithms, and has the value 2.718. If the loop gain, the loop length, or the bandwidth have values that are too low, the tube will break into oscillation and will no longer operate as a noise generator to produce a relatively uniform frequency spectrum of high power noise.

When the tube is operating within the conditions set forth above, the tube produces a saturated output of relatively high power random noise having a relatively uniform magnitude and distributed uniformly within a frequency range equal to that of the tube.

Figure 2:
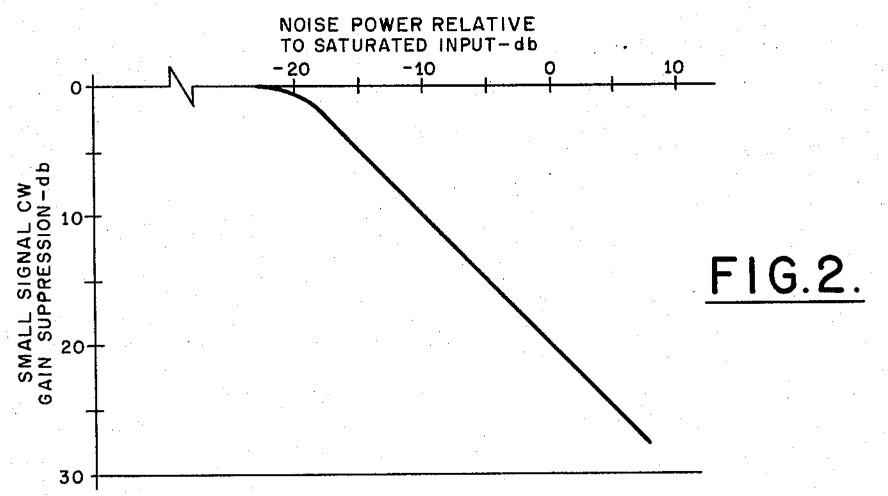
FIG. 2 is a graph used in explaining the operation of the device of this invention.

The exact theory of operation of this tube as a noise generator is not now completely understood, but it is believed that its operation is related to the characteristics of the traveling wave tube that the small signal C.W. gain of such a tube in the presence of a wide band noise signal decreases as a function of the noise power input of said tube, and to the fact that the noise in the closed loop will build up to a greater magnitude in a shorter time than will the oscillations at any particular frequency. The first of these conditions is illustrated in the graph of FIG. 2 showing that at a noise power level approximately 20 db below the saturation level of the tube the small signal C.W. gain of the tube begins to fall with a slope of approximately unity. Therefore, because the time delay around the closed loop may be the order of .02 microsecond and the build-up time of oscillations in the loop normally is about one microsecond, the noise will circulate around the loop many times and achieve a relatively high level before oscillations can be sustained within the tube. As the noise power builds up, the small signal C.W. gain of the tube begins to fall and this process continues until the tube saturates on its own noise, at which point the small signal C.W. gain is too low to sustain oscillations around the loop.

In the mode of operation just described, the output of the tube is a relatively uniform spectrum of noise throughout a frequency range equal to the bandwidth of the traveling wave tube. A traveling wave tube operated as an amplifier inherently is a broadband device so that the noise generator of this invention also inherently is a broadband device. A variety of different traveling wave tubes have been operated successfully in accordance with this invention and full saturation output power has been obtained from tubes having saturation output powers ranging from 10 milliwatts to 200 watts.

Figure 3:
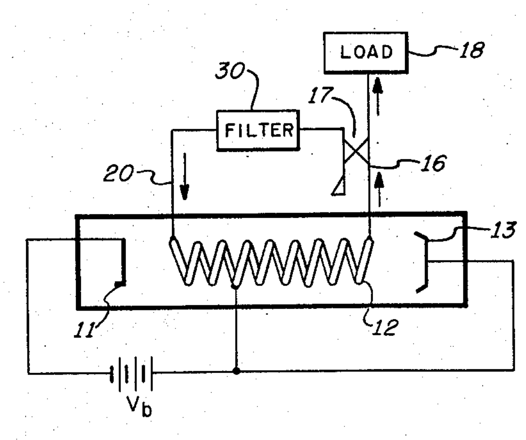
FIG. 3 is a simplified schematic illustration of an alternative embodiment of the present invention.

In some applications of the present invention it may be desired that the output noise of the tube be confined within a more narrow band of frequencies. This may be accomplished with the arrangement illustrated in the simplified schematic diagram of FIG. 3 wherein a filter 30 is inserted in the feedback loop between directional coupler 17 and input terminal 20. In this embodiment of the invention, the bandwidth of the output noise will be determined by the bandwidth of filter 30.

Operation of the device of this invention with loop bandwidths between 50 and 100 megacycles is difficult and can be achieved only with high open-loop gains which are too high for practical utility.

One operative embodiment of the present invention which used a STS–101 traveling wave tube, manufactured by Sperry Electron Tube Division, Sperry Rand Corporation, Gainesville, Florida, had the following characteristics:

| | |
|---|---|
| Helix voltage | 5.6 kilovolts. |
| Collector voltage | 5.6 kilovolts. |
| Length of closed loop | Greater than 0.2 microsecond. |
| Coupling value of directional coupler | 20 db. |
| Open loop gain of tube | 43 db (nom.). |
| Frequency bandwidth of output noise | Greater than 2000 mc. |
| Power level of output noise | 200 watts. |

While the invention has been described in its preferred embodiments, the words which have been used are words of description rather than of limitation and that changes within the purview of the appended claims may be made without departing from the true scope and spirit of the invention in its broader aspects.

What is claimed is:

1. A noise source comprising an electron tube having electron beam forming means and a slow wave propagating structure having electromagnetic wave input and output terminals and arranged for energy exchange between said beam and waves propagating on said structure, a feedback path coupled between said output and input terminals thereby forming a closed loop with said tube, said loop having a time delay great enough that correlation between newly generated noise and noise coupled from said feedback loop into said input terminal is of the order of $e^{-20}$, where $e$ is the base of natural logarithms, said loop having a minimum bandwidth of approximately 50 megacycles and an open loop gain sufficiently greater than unity to assure that at saturation the power level of the noise in said loop is sufficiently great to reduce considerably below unity the closed loop small signal C.W. gain for waves having a wavelength equal to a submultiple of the electrical length of said loop.

2. A noise generator comprised of the combination of a traveling wave tube having electromagnetic wave input and output terminals, means coupled to said output terminal for extracting waves therefrom, a wave propagating path for coupling said extracted waves to said input terminal thereby forming a closed loop with said tube, said loop having a propagating time for waves propagating therein approximately equal to at least twenty times the reciprocal of the operating bandwidth of said loop, said loop having a minimum bandwidth of approximately 50 megacycles and an open-loop gain of at least 10 db for an operating bandwidth of 2000 megacycles and being an inverse function of the bandwidth of the loop.

3. A noise source comprising a traveling wave tube having electromagnetic wave input and output terminals, means for abstracting waves from said output terminal and coupling them back as the sole input to said input terminal thereby forming a closed loop with said tube, the minimum time for propagation of waves around said loop being 20 times the reciprocal of the bandwidth of said loop, said loop having a minimum bandwidth of 50 megacycles and an open-loop gain of at least 10 db and sufficiently high to prevent oscillations from building up in said tube.

4. Noise generating apparatus comprising a traveling wave tube having electromagnetic wave input and output terminals, means for abstracting a portion of the electromagnetic waves from said output terminal and coupling them to said input terminal and thereby forming a closed loop with said tube, the time of propagation of waves around said loop being equal to at least approximately twenty times the reciprocal of the bandwidth of said loop, the open-loop gain of said loop being an inverse function of the bandwidth of said loop and being determined from the relationship of at least approximately 10 db gain for a bandwidth of 2000 megacycles and increasing approximately an additional 10 db for each decrease by $\frac{1}{10}$ in the bandwidth.

5. A noise source comprising a traveling wave tube having electromagnetic wave input and output terminals, said tube inherently being a generator of noise, a feedback wave propagation path coupling said output terminal to said input terminal and thereby forming a closed loop with said tube, said loop having a time delay great enough that correlation between newly generated noise and noise coupled from said feedback loop into said input terminal is of the order of $e^{-20}$, where $e$ is the base of natural logarithms, said loop having a minimum bandwidth of approximately 50 megacycles and a relatively high open-loop gain that changes by the amount $10x$ db for a bandwidth change by a factor of $x/10$, where $x$ is any fractional or whole number.

6. A high power electron tube noise generator comprising, a traveling wave tube having electron beam forming means, slow wave propagating means, and input coupling means and output coupling means respectively coupled at spaced points on said slow wave propagating means, a feedback wave propagating path coupling said output coupling means to said input coupling means, thereby forming a closed loop path with said slow wave propagating means, said feedback wave propagating path being the only coupling to said input coupling means, said closed loop path having a time delay therearound that is great enough so that correlation between newly generated noise in said tube and noise coupled from said wave propagating path to said input coupling means is of the order of $e^{-20}$, where $e$ is the base of natural logarithms, said closed loop path having a minimum bandwidth of approximately 50 megacycles and a relatively high open-loop gain of at least 10 db.

7. The combination claimed in claim 3 wherein said closed loop includes frequency filtering means.

References Cited by the Examiner

UNITED STATES PATENTS

| | | | |
|---|---|---|---|
| 2,712,605 | 7/55 | Field | 331—82 |
| 2,724,775 | 11/55 | Field | 331—82 |
| 2,768,297 | 10/56 | Brück et al. | 331—82 XR |

JOHN KOMINSKI, *Acting Primary Examiner.*